United States Patent [19]

Kunz et al.

[11] Patent Number: 5,335,045
[45] Date of Patent: Aug. 2, 1994

[54] PHOTOGRAPHIC PRINTING MACHINE FOR COPYING ORIGINALS ON SHEET-LIKE COPY MATERIAL

[75] Inventors: Jürg Kunz, Bülach; Hugo Knecht, Schöfflisdorf; Erich Binder, Buchs, all of Switzerland

[73] Assignee: Gretag Imaging AG, Regensdorf, Switzerland

[21] Appl. No.: 63,083

[22] Filed: May 18, 1993

[30] Foreign Application Priority Data

May 22, 1992 [DE] Fed. Rep. of Germany ..... 92810392

[51] Int. Cl.⁵ ............................................. G03B 27/58
[52] U.S. Cl. .................................................... 355/72
[58] Field of Search ...................... 355/72, 54; 242/58

[56] References Cited

U.S. PATENT DOCUMENTS

| | | | |
|---|---|---|---|
| 3,580,674 | 5/1971 | Schunck | 355/72 X |
| 4,161,364 | 7/1979 | Hanai et al. | 355/72 |
| 4,442,744 | 4/1984 | Raymond | 83/614 |
| 4,813,321 | 3/1989 | Landsman | 83/111 |
| 4,849,792 | 7/1989 | Horiguchi et al. | 355/72 |

FOREIGN PATENT DOCUMENTS

| | | |
|---|---|---|
| 367879 | 5/1990 | European Pat. Off. . |
| 1219048 | 6/1966 | Fed. Rep. of Germany . |
| 2906042 | 8/1980 | Fed. Rep. of Germany . |
| 3943160 | 7/1991 | Fed. Rep. of Germany . |
| 60-232337 | 11/1985 | Japan . |

Primary Examiner—Richard A. Wintercorn
Attorney, Agent, or Firm—Burns, Doane, Swecker & Mathis

[57] ABSTRACT

A photographic printing machine for copying originals on sheet-like copy material having a storage reservoir for the copy material, and a feed mechanism which transports the copy material from the storage reservoir to an imaging unit in which the originals are copied onto the sheet-like copy material. The storage reservoir has numerous cassettes, the cassette openings of which are positioned side by side along a direction perpendicular to the transport direction of the copy material. The feed mechanism has a carriage that can move along the direction perpendicular to the transport direction of the copy material, for transporting the copy material from the respective cassette opening to the imaging unit.

16 Claims, 6 Drawing Sheets

PHOTOGRAPHIC PRINTING MACHINE FOR COPYING ORIGINALS ON SHEET-LIKE COPY MATERIAL

BACKGROUND OF INVENTION

The present invention relates to a photographic printing machine for imaging originals, such as photographic positives or negatives, onto copy material such as photographic paper, the photographic printing machine having a copy material storage reservoir and a feed mechanism for transporting the copy material from the storage reservoir to an imaging unit in which the originals are imaged on sheet-like copy material.

Today, photographic printing machines of various designs for copying originals are used especially in photography laboratories where the originals are usually either positive or negative films and the copy material is photographic paper. In typical photographic printing machines, long rolls of paper are used. However, it is desirable to be able to make copies on individual sheets of photographic paper. In particular, one could mention in this regard the enlargement of individual negatives or positives, which customers increasingly request.

Presently, in order to make such copies, a single cassette stores the photographic paper and a feed mechanism transports the photographic paper to the imaging unit where the copying of the original (e.g., a negative) onto the paper take place. As a result, all units (storage reservoir, feed mechanism, imaging unit) can be stationarily located in a fixed position of the photographic printing machine. But with this approach it is only possible to make copies on paper with a single width and on a single kind of paper. Should a wider or narrower piece of paper or even a different kind of paper (e.g., a kind of paper that is coated with a different emulsion) be used, the machine operations have to be interrupted and the cassette located in the machine has to be replaced with a cassette containing the desired paper. Alternately, numerous customer orders requiring the same kind of paper have to be batched and the copying on different paper widths has to be performed in a number of subsequent steps. But this can often result in incorrect processing of customer orders (e.g., some pictures are forgotten, etc.). Given the wide variety of customer requests just with respect to the different dimensions of the desired copies, photographic printing machine operations have to be interrupted quite often, and a cassette with the desired paper width has to be inserted into the machine in order to be able to produce the correct copies with the desired dimensions. This significantly detracts from the efficiency of such a machine.

Another machine is known from DE-A-39 43 160. In the machine described therein, paper having different formats is available, but in the form of stacks of individual sheets. With the aid of adjustable carriages alongside the paper stack, one sheet of the desired paper size is removed from the appropriate stack and fed for further processing. Once a sheet is removed from the stack, the stack is thinner than before so that the relative position of the top-most sheet has to be re-scanned so that the carriage will stop at the fight position. As a result, the machine re, quires constant detection of the position of the top-most sheet of each paper stack—and, at a minimum, new scanning must occur whenever a sheet is removed from a respective stack. But such detection of the position of the top-most sheet of each stack is associated with comparatively complicated technical requirements (scanners, control electronics and so forth).

SUMMARY OF INVENTION

Therefore, a purpose of the present invention is to provide a photographic printing machine that is not technically complicated and with which it is possible to produce photographic prints having different formats on different types of copy material (e.g., photographic paper that is coated with a different kind of emulsion). Furthermore, it is a purpose of the invention to avoid any need to interrupt machine operations and exchange a paper cassette whenever copy materials have to be changed because of a need for copy material having a different width and/or the need for a different kind of paper.

In accordance with the invention, this task is solved by using a paper storage composed of numerous cassettes, the openings of which are positioned side by side and perpendicular to the transport direction of the copy material, and by using a feed with an adjustable carriage that is perpendicular to the transport direction of the copy material, whereby the carriage transports copy material from a cassette opening to an imaging unit. As a result, a number of copy materials can be used without having to interrupt machine operations and without having to replace a cassette with a desired copy material. In this way, it is possible to have available paper of a different width and/or another kind of paper (e.g., photographic paper that is coated with another emulsion). As a result, the efficiency of the machine can be increased significantly.

In another embodiment of a photographic printing machine according to the invention, at least one further configuration of such cassettes is provided above or below the first set of cassettes. As a result, an even greater number of paper types both with respect to other paper widths as well as with respect to other emulsions can be made available so that the majority of customer requests can be accommodated without having to interrupt machine operations and without having to insert other cassettes into the machine. In addition, with this kind of configuration, the time required to access each type of paper is held relatively low and, the interior space of the photographic printing machine is well-utilized. As a result, the efficiency of the photographic printing machine is increased and, the dimensions of the photographic printing machine are not unnecessarily increased so that the space requirements of such a machine are kept minimal.

In an exemplary embodiment, reasonable access times and a practical number of available paper types can be achieved using a photographic printing machine in which a cassette configuration has four cassettes set up side by side. Furthermore, the dimensions of the photographic printing machine remain relatively small, which in addition to the aforementioned advantages regarding the use of the interior space of the machine and with respect to the low access time, also has advantages with respect to the delivery of such a machine. Should the width of such a machine be too great, then the machine might not pass through some doorways. But if the dimensions of the machine are kept within certain limits, then the photographic printing machine can simply be pushed through the doorway into the desired room in which it is supposed to be stationed.

In another embodiment of a photographic printing machine proposed by the invention, a separate carriage is provided for each cassette configuration. This measure assures maximum efficiency with respect to access time for each of the desired kinds of paper.

For best results, one cassette configuration has cassettes with different copy material widths and/or different types of copy materials (e.g., photographic papers coated with different types of emulsion).

In another exemplary embodiment of a photographic printing machine according to the invention, the cassettes having the largest copy material width within one cassette configuration are positioned at that end of the cassette configuration that is furthest from the imaging unit. This configuration of cassettes is advantageous because the largest formats are requested less frequently and, furthermore, the imaging time for the largest formats is, of course, longer if the same light source is used. Within this longer imaging time, the carriage can transport the next requested paper to the imaging unit. For smaller formats, the carriage has relatively less time for transporting because the time required for imaging the small formats is correspondingly less.

In another embodiment of a photographic printing machine according to the invention, the carriage is provided with pairs of transport rolls, whereby at least that pair of transport rolls that is positioned closest to the cassette opening can be swung away from the transport level of the copy material or swung toward the transport level so that it either releases the copy material or removes it from the cassette opening to be fed, and guides it between the transport rolls. This allows for simple "grasping" and transporting of the paper between the transport mils from each cassette to the imaging unit. In addition, a simple change in paper is possible: the pair of transport rolls nearest the cassette opening is swung away from the transport level of the copy material; the carriage approaches the cassette in which the next requested paper is contained; the pair of transport rolls is again swung toward the transport level of the copy material; it grasps the paper between the transport rolls and transports it to the imaging unit.

Another embodiment of a photographic printing machine according to the invention is distinguished by the storage of copy material in the cassettes in the form of one long roll and by designing the carriage with a cutting unit that cuts the roll into a sheet-like piece once the roll has been extended to a desired length of copy material. The cut sheet-like piece is then fed to the imaging unit. The paper can be stored in the form of one long roll in the individual cassettes—it need not be inserted into the cassettes in a specific format. Only at the time the sheet is required is the paper roll pulled out to a given length and cut into a sheet-like piece.

In another embodiment of a photographic printing machine according to the invention, the cassettes belonging to a cassette configuration are firmly attached to a separator wall in which an opening is located for each respective cassette opening and through which the cassette opening is guided. This embodiment is distinguished by cassettes which can be easily coupled and, if required, easily exchanged, and which do not require any special adjustment with respect to the carriage because the carriage in this embodiment slides along at a fixed distance from the separator wall, and a cassette attached to the separator wall automatically has the correct distance to the carriage. Furthermore, the separator wall can also serve to shield the interior space against light from the outside.

In an especially advantageous embodiment of a photographic printing machine, baffles are provided on the side of the separator wall facing the carriage. The end of the roll coming from each cassette is guided between the baffles. Recesses are designed in these baffles on the side facing the carriage; the transport rolls located at the carriage grip into the recesses and pull out the copy material from the respective cassette opening. In order to image the paper, the cut sheet is transported to the imaging unit whereas the end of the roll is maintained between the baffles. If this paper format is required once again, then the receded transport rolls of the carriage are returned to the recess in the fashion described above, swung toward the transport level, grip the end of the roll, pull out a piece of roll to the given length, cut a sheet-like piece, and transport it to the imaging unit. The end of the roll is again maintained between the baffles, etc. This embodiment is distinguished by a high degree of operational reliability and allows for reliable access to the desired kind of paper because the end of each piece of paper is maintained in a defined position between the baffles.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
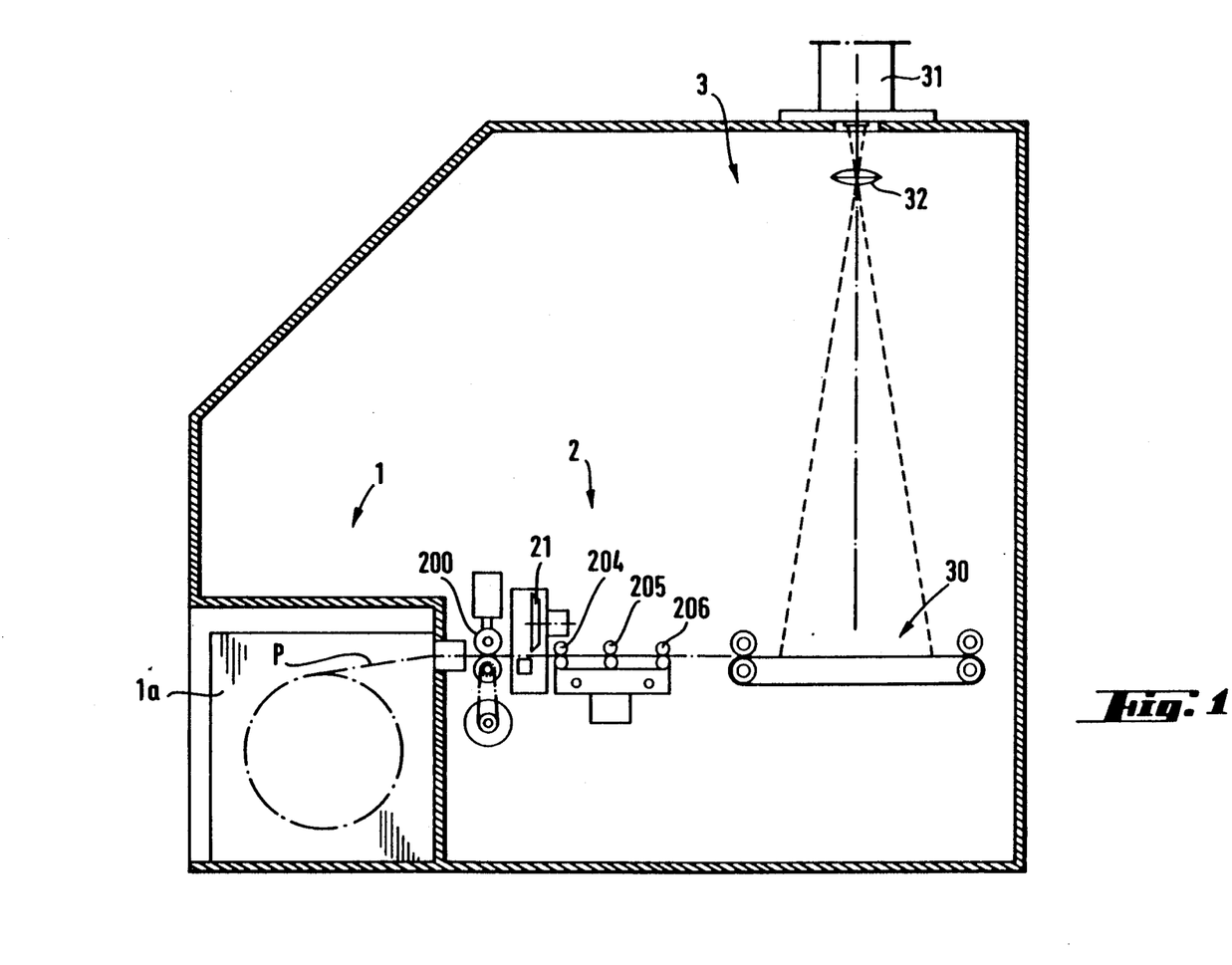
FIG. 1 shows a longitudinal section of a schematic design of an exemplary embodiment of a photographic printing machine according to the invention.

In the schematic depiction of a section of an exemplary photographic printing machine according to the invention, as shown in the embodiment of FIG. 1, one can recognize a storage reservoir 1 for copy material, (e.g., photographic paper) whereby only one cassette can be seen. Also shown are a feed mechanism 2 to feed the paper to a paper hold 30 of an imaging unit 3 where a light source 31 and an imaging lens 32 are schematically indicated.

Figure 2:
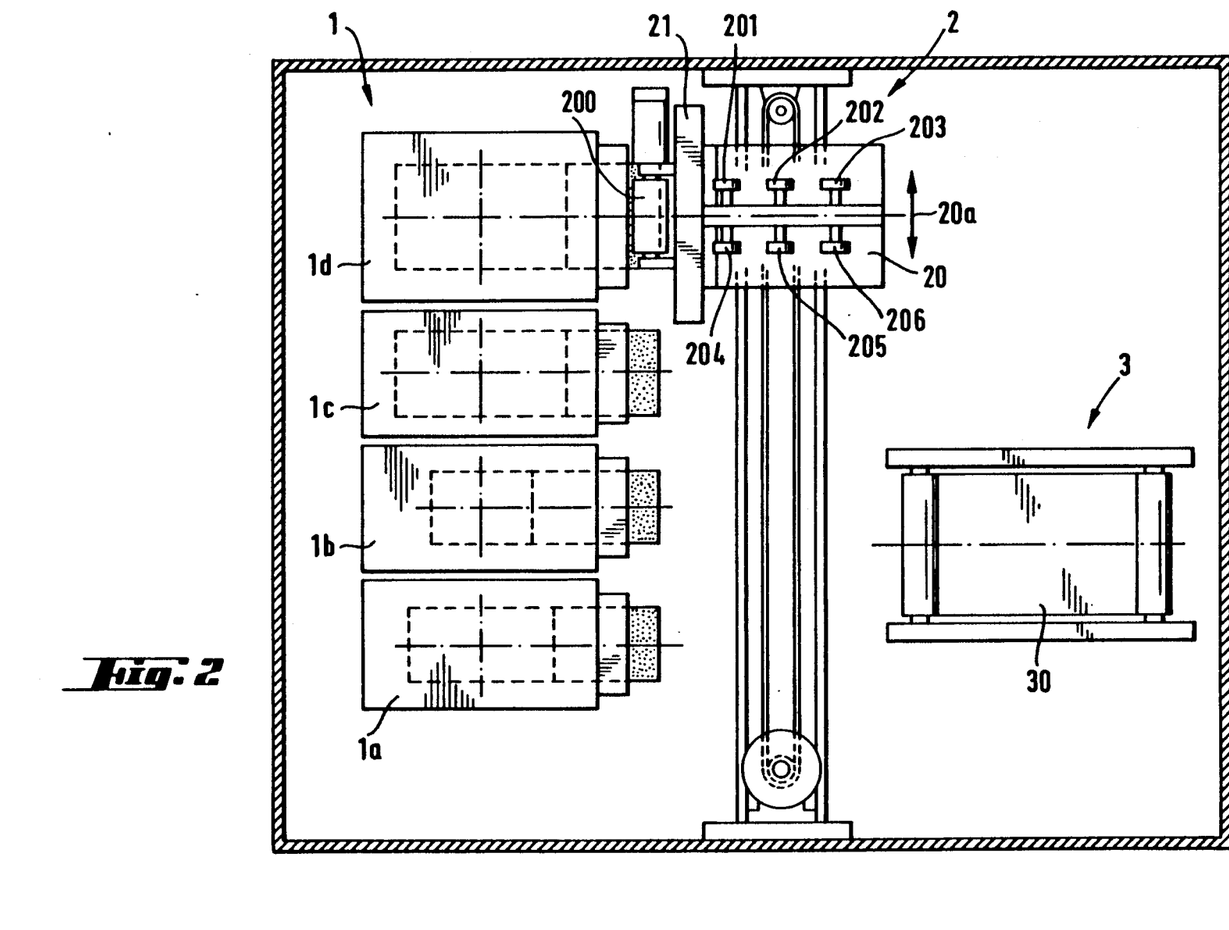
FIG. 2 shows a bird's eye sectional view of a schematic design of the photographic printing machine illustrated in FIG. 1.

From a bird's eye view of this FIG. 1 section of the photographic printing machine, as illustrated in FIG. 2, one can see that the storage reservoir 1 is composed of numerous cassettes that are positioned side by side. In the embodiment shown in FIG. 2, there are four cassettes—1a, 1b, 1c and 1d. Those skilled in the an will appreciate that there can be more than four or less than four cassettes, especially if the dimensions of the interior space of the housing make this possible or require it. Furthermore, one can see from the bird's eye view, a carriage 20 which slides perpendicular to a transport direction of the photographic paper and which can slide to the cassette opening of each cassette, and in FIG. 2, is located in front of the cassette opening of cassette 1d that is located furthest from the paper hold 30. The paper with the largest paper width is stored in this cassette. One can also see in FIG. 2 a cutting unit 21 as well as a pair of transport rolls—or only their upper transport robs. There will be more explicit discussion below about the cutting unit 21 and the pair of transport rolls and about the way they work.

Figure 3:
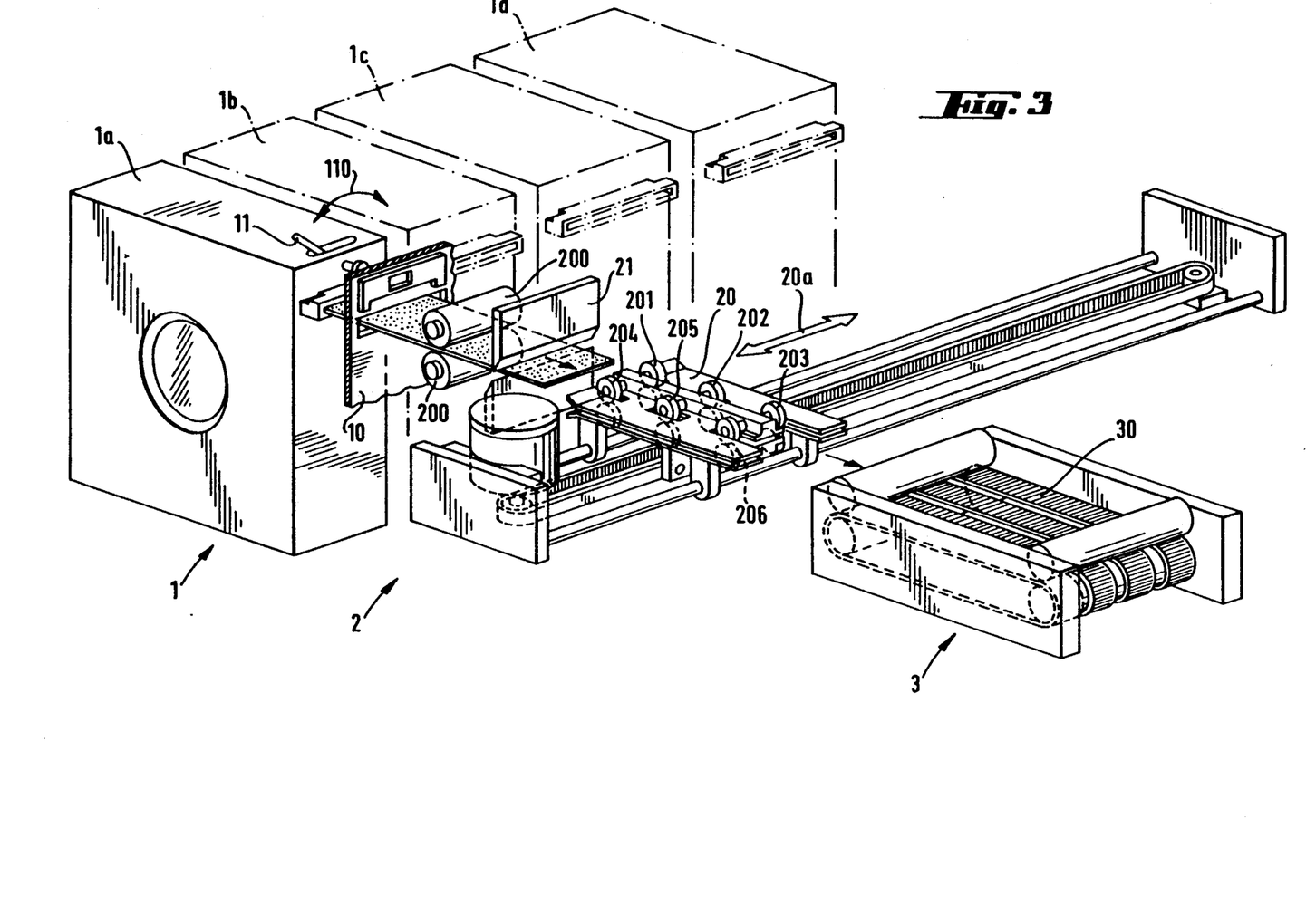
FIG. 3 shows an enlarged view of essential pans for the exemplary FIG. 1 photographic printing machine (without housing)

FIG. 3 illustrates essential pans of the FIG. 1 embodiment, once again in a type of exploded view. For reasons of simplicity, the housing and the light source 31, as well as the imaging lens 32 (FIG. 1 ), are not illustrated. Only the paper hold 30 is shown of the imaging unit 3 (FIG. 1). Instead, another detail of an exemplary embodiment is shown, namely a separator wall 10, of which only a section is depicted so that the remaining diagram is not blocked. The cassettes 1a-1d can be attached to this separator wall, whereby the cassette opening of each cassette can be guided through a corresponding opening in the separator wall 10. In order to make it clear that the cassettes 1a-1d can be attached to this separator wall 10, a mechanism 11 is depicted in FIG. 3, by means of which the cassette can be attached. This is also symbolized by the arrow 110. There will be greater discussion below about the separator wall and the configuration of cassettes relative to the separator wall. One can also see in FIG. 3 the pair of transport rolls 200 that are located closest to the cassette opening, the cutting unit 21, as well as the pair of guide rolls 201-206 of the carriage 20. The arrow 20a symbolizes the adjustability of the carriage 20 that is perpendicular to the transport direction of the paper.

Figure 4:
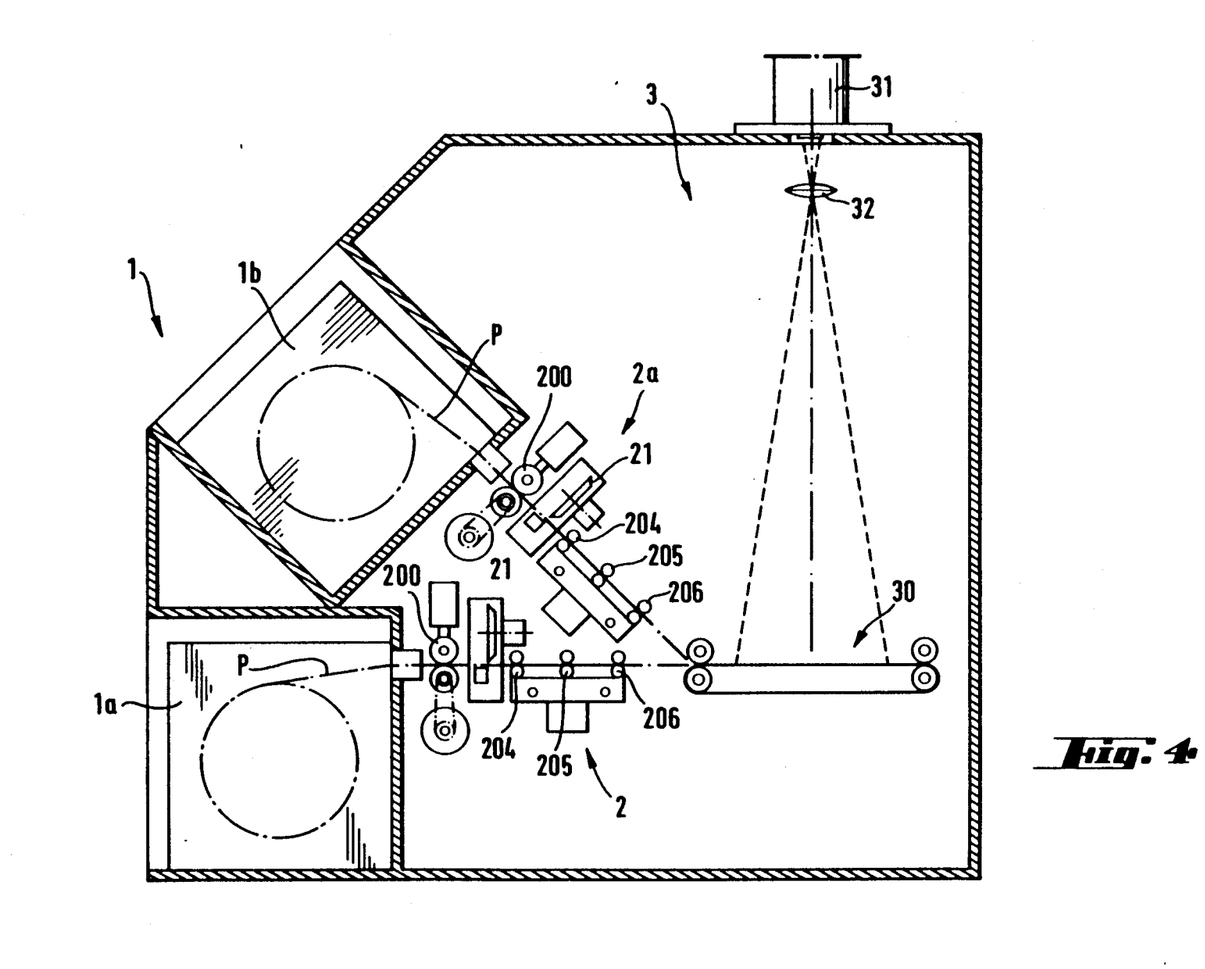
FIG. 4 shows a sectional view of the schematic design of another embodiment of a photographic printing machine with another cassette configuration located on top of the first cassette configuration.

Another embodiment of the photographic printing machine is contained in FIG. 4 where the storage reservoir 1 has a first cassette configuration (cassettes 1a-1d in FIG. 1) similar to the embodiment shown in FIG. 1. In addition to this fast cassette configuration, the storage reservoir of the FIG. 4 embodiment has another cassette configuration that is located above the first cassette configuration. This embodiment also has another feed mechanism 2a for this additional cassette configuration. Depending upon the cassette configuration from which the paper format or paper type (e.g., other emulsion) for the next copy is desired, either the feed mechanism 2 or the feed mechanism 2a guides the correct paper to the paper hold 30. Naturally, only one feed mechanism can be used, but in such a case, it must be correspondingly adjustable so that it can guide paper from both cassette configurations to the paper hold. Those skilled in the an will appreciate that numerous types of paper can be made available by using either numerous cassettes in each cassette configuration or by having even more cassette configurations—conceivably each with its own feed mechanism.

When the photographic printing machine is operating, the carriage 20 goes to the cassette (for example, in FIG. 2 to cassette 1d) in which the appropriate type of paper is stored for the next desired copy. For example, the paper is stored in the form of a long paper roll in the cassette. The paper end jutting out of the cassette opening is grasped by the pair of transport rolls 200 of the carriage 20, and is pulled out to a given length. Then it is cut by the cutting unit 21. Then the carriage assumes a position in which it can feed the cut sheet to the paper hold 30 and the cut sheet is fed to the paper hold 30 by means of the pair of transport rolls 201-206 of the carriage 20. Once the cut sheet arrives at the paper hold 30, then the original (e.g., a negative) can be imaged there onto the paper. Analogously, the same is true for the embodiment in FIG. 4 where in addition to the first cassette configuration there is a further cassette configuration above the first cassette configuration.

Figure 5:
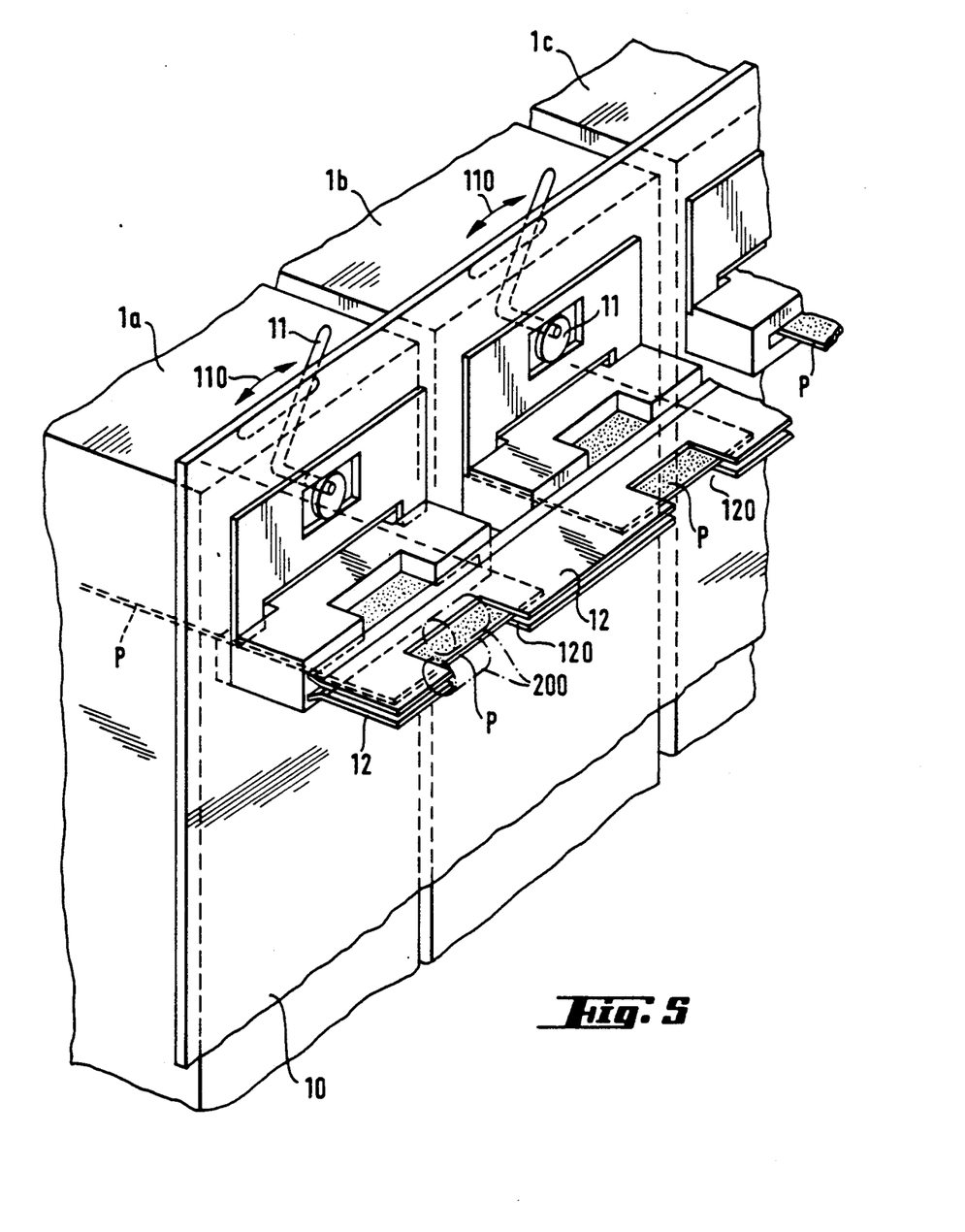
FIG. 5 shows an enlargement of a separator wall with attached cassettes and baffles that are positioned on a side of the separator wall facing the carriage in front of each cassette opening.
Figure 6A:
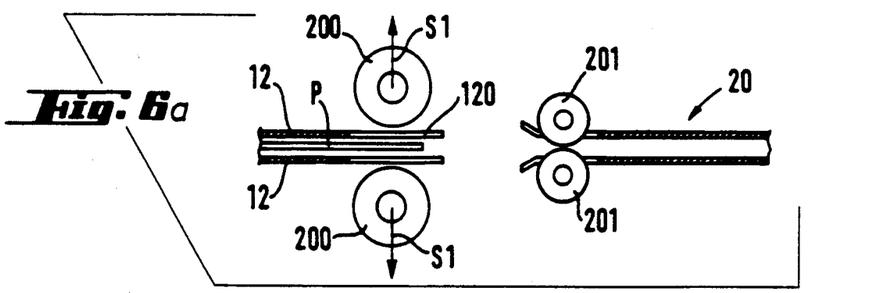
FIGS. 6a–e show a schematic flow chart for pulling out and cutting the paper from the cassette.
Figure 6B:
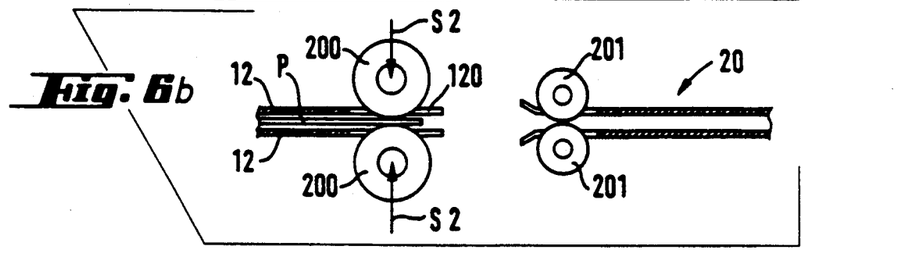
Figure 6C:
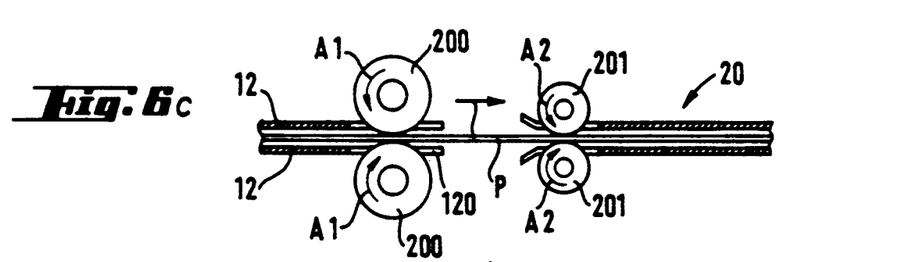
Figure 6D:
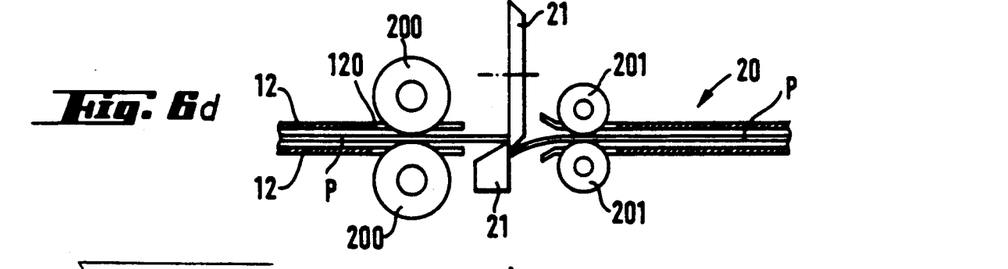
Figure 6E:
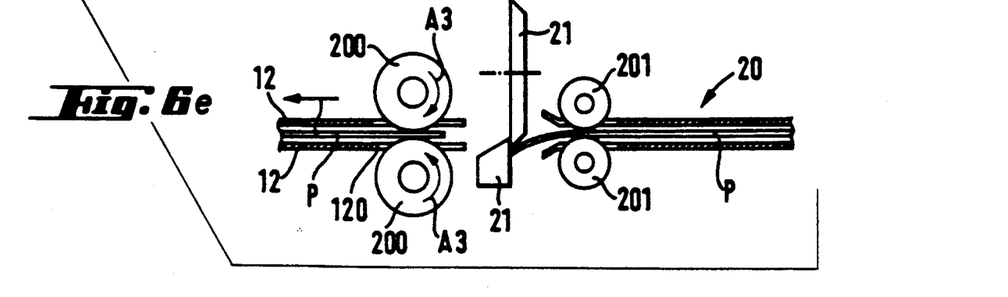

With the help of FIGS. 5 and 6, there is detailed discussion below of how the paper end that juts out of the cassette opening is held and, if necessary, pulled out of the cassette and cut. For this purpose, in FIG. 5 there is a sectional view of an exemplary embodiment in which the cassettes are attached to the separator wall 10 by means of the mechanism 11. The corresponding cassette opening is guided through an opening of the separator wall 10. The separator wall 10 can also serve to screen the interior space of the photographic printing machine against light from the outside in addition to attaching the cassettes. Baffles 12 are located in front of the respective cassette opening, and the end of the paper roll jutting out of the cassette opening is held between the baffles. The baffles 12 are designed with recesses 120 into which the transport rolls 200 of the carriage 20 (FIG. 2) can grasp the end of the paper roll. In order to clarify this, the pair of transport rolls 200 are illustrated by dashed lines. But the steps of grasping by the pair of transport rolls 200, of pulling out the paper, cutting, etc., are shown more clearly in FIG. 6 (FIGS. 6a, 6b, 6c, 6d, 6e). In FIG. 6a, it can be seen that the individual transport rolls of the pair of transport rolls 200 can be swung away from the transport level (e.g., in the direction of arrow S1). When the transport rolls are swung far enough away so that its lowest and highest points, respectively are above and below, respectively the baffles 12 (FIG. 6a), then the carriage can be moved in a perpendicular direction without the baffles 12 obstructing the transport mils (See FIG. 5). So that this can occur as rapidly as possible, the baffles are designed as thinly as possible. Once the carriage has arrived at the desired cassette, the transport rolls of the pair of transport rolls 200 are swung toward the transport level (e.g., in the direction of arrow S2) and grip the paper P (FIG. 6b). The rolls are then driven in the direction of the arrow A1 and thereby pull the paper out to a given length (FIG. 6c). Then the paper P is located between the pairs of transport rolls 201-206 of which only pair 201 of the transport rolls is shown. The pair of mils 201 is driven in the direction of the arrow A2, with about the same circumferential velocity as the pair of rolls 200. The pulled out paper P is guided in the carriage 20. Once the paper P is pulled out to a given length, the cutting unit 21 cuts off a sheet-like piece (FIG. 6d). The end of the paper roll is then pushed back again between the baffles 12 with the aid of the pair of rolls 200, by driving the rolls in the direction of the arrow A3, where the paper is then held (FIG. 6e). Then the pair of rolls 200 is again swung away from the transport level (see FIG. 6a) and the carriage assumes a position in which it can guide the cut sheet to the paper hold 30. As soon as the sheet is guided to the paper hold 30, imaging can occur there. In this time, the carriage can already make available the next sheet of paper in the way described above. This allows for especially efficient operations of the photographic printing machine.

In the embodiments described here, four or eight different types of paper are made available, this number of different kinds of paper being considered sufficient for most customer requests. The paper width that is usually made available is 3.5 inches (picture size of 9 cm×13 cm), 5 inches (picture size of 10 cm×15 cm) and 8 inches, with all paper widths in satin or glossy, plus two special widths. But other paper widths (for example, up to 12 inches) can be made available. Commercially available 110 negative film (exposure field of about 13 mm×17 mm), 135 negative films (exposure field of about 24 mm×36 mm), or 120 negative film (exposure field of about 56 mm×56 mm or 56 mm×72 mm) can be used as originals. The paper cassettes are configured in such a way that the kinds of paper requested most often are positioned closest to the paper hold 30 so that the carriage has to move as little as possible or, best of all, not at all to the side. In exemplary embodiments, the cassettes with the largest paper width are positioned furthest away from the paper hold 30. This is done, on the one hand, because these formats are desired very rarely and, on the other hand, because the imaging time is longer for large formats using same light source. During this longer period of imaging, the carriage can make available the next sheet of paper. The smaller formats are located closer to the paper hold 30 so that the greatest possible efficiency of the machine is enabled for the smaller formats for which the imaging times are smaller as are the times in which the carriage has to make available the next sheet. The configuration of four cassettes in one set is especially expedient because then the width of the photographic printing machine is not so large that the photographic printing machine cannot be transported through doorways.

Other advantageous versions of the photographic printing machine are conceivable. For example, they can be equipped with sensors that display if the paper supply in one cassette is diminishing or if the cassette is empty. The separator wall 10 need not be one unit. A specially-designed separator wall can be attached to each cassette. Another carriage can be attached to the paper hold, whereby this carriage can also slide perpendicular to the transport direction so that the subsequent paper developing unit ("wet part") can be operated, the operational speed of such wet parts typically being slower than the feed and imaging unit. It is also conceivable that the pair of transport rolls 200 need not be located at the carriage, but rather, for example, at the separator wall or at the baffle so that each cassette has a separate adjustable pair of transport rolls for pulling out the paper. It would then be advantageous to coordinate the movements of the pair of rolls 200 directly with the coupling step. That is, at the moment the cassette is attached to the separator wall 10, with the aid of the coupling mechanism, the pair of rolls 200 is swung toward the transport level or during decoupling it opens correspondingly. It is also possible to provide a cutting unit 21 for each cassette. Naturally, it is also possible to provide numerous (that is more than two) cassette configurations in order to increase even further the number of different kinds of paper that could be made available.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Photographic printing machine for copying originals on sheet-like copy material comprising:
    a storage reservoir for copy material, said storage reservoir having a plurality of cassettes each of which includes a cassette opening, the cassette openings of said plurality of cassettes being positioned side by side in a direction substantially perpendicular to a transport direction of copy material;
    an imaging unit for imaging an original onto the copy material; and
    a feed mechanism for transporting the copy material from the storage reservoir to the imaging unit, said feed mechanism having a carriage that moves in a direction perpendicular to the transport direction of the copy material for transporting the copy material from at least one of said cassette openings to the imaging unit.

2. Photographic printing machine according to claim 1, wherein the plurality of cassettes comprises a fast configuration of cassettes and at least one further configuration of cassettes, said further configuration of cassettes being located above or below said first configuration.

3. Photographic printing machine according to claim 2, wherein a configuration of cassettes comprises four cassettes located side by side.

4. Photographic printing machine according to claim 3, wherein a separate carriage is provided for each cassette configuration.

5. Photographic printing machine according to claim 4, wherein the cassette configuration comprises cassettes containing different copy material widths and different types of copy material.

6. Photographic printing machine according to claim 5, wherein each cassette configuration comprises a cassette with a largest copy material width located at an end of the cassette configuration which is furthest from the imaging unit.

7. Photographic printing machine according to claim 6, wherein each carriage is provided with pairs of transport rolls, and wherein at least that pair of transport rolls being located closest to a cassette opening is movable away from the transport level of the copy material and/or movable toward the transport level so that this pair of transport rolls releases the copy material or pulls the copy material out of the cassette opening for transport and guidance between the transport rolls.

8. Photographic printing machine according to claim 7, wherein the copy material is stored in the cassettes as long rolls, and wherein the carriage is provided with a cutting unit which cuts a roll into a sheet-like piece after the copy material is pulled out to a given length, the cut sheet-like piece being guided to the imaging unit.

9. Photographic printing machine according to claim 8, wherein a cassette belonging to a cassette configuration is firmly attached to a separator wall, said separator wall including an opening with the cassette opening being guided through the separator wall opening.

10. Photographic printing machine according to claim 9, wherein baffles are positioned on a side of the separator wall facing a carriage, an end of a roll coming out of a cassette being guided between the baffles, said baffles further including recesses on a side of the baffles facing the carriage such that transport rolls located at the carriage grasp copy material in the recesses and pull the copy material from the respective cassette opening.

11. Photographic printing machine according to claim 1, wherein each of said plurality of cassettes comprises cassettes containing different copy material widths and different types of copy material.

12. Photographic printing machine according to claim 1, wherein the cassette with a largest copy material width is located at an end of the cassette configuration which is furthest from the imaging unit.

13. Photographic printing machine according to claim 1, wherein said carriage is provided with pairs of transport rolls, and wherein that pair of transport rolls being located closest to a cassette opening is movable away from the transport level of the copy material and/or movable toward the transport level so that this pair of transport rolls releases the copy material or pulls the copy material out of the cassette opening for transport and guidance between the transport rolls.

14. Photographic printing machine according to claim 1, wherein the copy material is stored in each of the plurality of cassettes as long rolls, and wherein the carriage comprises a cutting unit which cuts a roll into a sheet-like piece after the copy material is pulled out to a given length, the cut sheet-like piece being guided to the imaging unit.

15. Photographic printing machine according to claim 1, wherein the cassettes are firmly attached to a separator wall, said separator wall including openings for the cassette openings with the cassette openings being guided through the separator wall openings.

16. Photographic printing machine according to claim 15, wherein baffles are positioned on a side of the separator wall facing a carriage, an end of a roll coming out of a cassette being guided between the baffles, said baffles further including recesses on a side of the baffles facing the carriage such that transport rolls located at the carriage grasp copy material in the recesses and pull the copy material from the respective cassette opening.

* * * * *